(12) United States Patent
McCarthy et al.

(10) Patent No.: US 8,733,798 B2
(45) Date of Patent: May 27, 2014

(54) CONDUIT CONNECTOR DEVICE AND CONDUIT SYSTEM

(75) Inventors: Craig McCarthy, Denton, MD (US); Scott Beeson, San Diego, CA (US)

(73) Assignee: Holocom, Inc., San Diego, CA (US)

( * ) Notice: Subject to any disclaimer, the term of this patent is extended or adjusted under 35 U.S.C. 154(b) by 452 days.

(21) Appl. No.: 12/686,547

(22) Filed: Jan. 13, 2010

(65) Prior Publication Data

US 2010/0193060 A1 Aug. 5, 2010

Related U.S. Application Data

(60) Provisional application No. 61/150,164, filed on Feb. 5, 2009.

(51) Int. Cl.
*F16L 3/10* (2006.01)

(52) U.S. Cl.
USPC ............................................ 285/64; 52/220.7

(58) Field of Classification Search
USPC ............ 285/64, 417, 419; 138/155, 106, 107; 439/207, 210; 174/21 R, 19, 24, 64, 174/68.1, 95, 96; 52/220.7
See application file for complete search history.

(56) References Cited

U.S. PATENT DOCUMENTS

| 686,052 | A | * | 11/1901 | Golding | 174/97 |
|---|---|---|---|---|---|
| 1,277,550 | A | * | 9/1918 | Connell | 138/106 |
| 1,676,486 | A | * | 7/1928 | Frederickson | 285/64 |
| 2,137,536 | A | * | 11/1938 | McConnell | 174/72 C |
| 2,666,907 | A | * | 1/1954 | Hensley, Jr. | 439/111 |
| 2,917,083 | A | * | 12/1959 | Duvall et al. | 285/284.1 |
| 2,965,587 | A | | 10/1960 | Fisher | |
| 3,091,657 | A | | 5/1963 | Stuessel | |
| 3,243,503 | A | | 3/1966 | Burley | |
| 3,281,005 | A | * | 10/1966 | Schumacher | 220/3.8 |
| 3,312,251 | A | | 4/1967 | Marks et al. | |
| 3,335,599 | A | | 8/1967 | Hallman | |
| 3,401,721 | A | | 9/1968 | George | |
| 3,562,402 | A | | 2/1971 | Dwyer | |
| 3,570,546 | A | | 3/1971 | Jackson | |
| 4,016,356 | A | | 4/1977 | McLoughlin | |
| 4,077,434 | A | | 3/1978 | Sieckert et al. | |
| 4,199,206 | A | | 4/1980 | Haworth et al. | |
| 4,203,639 | A | | 5/1980 | VandenHoek et al. | |
| 4,232,183 | A | | 11/1980 | Person | |
| 4,277,123 | A | | 7/1981 | Haworth et al. | |
| 4,370,008 | A | | 1/1983 | Haworth et al. | |
| 4,378,727 | A | | 4/1983 | Doss | |

(Continued)

FOREIGN PATENT DOCUMENTS

DE 29606102 7/1996

*Primary Examiner* — David E Bochna
*Assistant Examiner* — James Linford
(74) *Attorney, Agent, or Firm* — Procopio Cory Hargreaves & Savitch LLP

(57) ABSTRACT

A conduit connector device includes an open-ended sleeve with aligned openings through upper and lower walls of the sleeve for insertion of a fastener to secure the lower wall of the sleeve to a support. A cover member or bridge is inserted into the sleeve between two conduit ends to cover the opening in the upper wall after the lower wall is attached to the support, restricting access to the previously inserted fastener. The ends of two adjacent lengths of conduit to be connected are inserted into opposite ends of the sleeve to abut the opposite ends of the bridge, and the adjacent lengths of conduits are thereby attached to the support.

7 Claims, 17 Drawing Sheets

(56) References Cited

U.S. PATENT DOCUMENTS

| | | |
|---|---|---|
| 4,398,564 A | 8/1983 | Young et al. |
| RE31,733 E | 11/1984 | Haworth et al. |
| 4,546,590 A | 10/1985 | Finch et al. |
| 4,841,699 A | 6/1989 | Wilson et al. |
| 4,911,510 A | 3/1990 | Jenkins |
| 5,013,112 A | 5/1991 | Hellwig |
| 5,024,251 A | 6/1991 | Chapman |
| 5,024,614 A | 6/1991 | Dola et al. |
| 5,271,585 A | 12/1993 | Zetena, Jr. et al. |
| 5,303,320 A | 4/1994 | Duffie |
| 5,435,606 A | 7/1995 | Navazo |
| 5,473,994 A | 12/1995 | Foley et al. |
| 5,672,845 A | 9/1997 | Greenfield et al. |
| 5,685,113 A | 11/1997 | Reuter et al. |
| 5,789,064 A | 8/1998 | Valente et al. |
| 5,831,211 A | 11/1998 | Gartung et al. |
| 6,143,984 A | 11/2000 | Auteri |
| 6,150,610 A | 11/2000 | Sutton |
| 6,216,746 B1 | 4/2001 | Guebre-Tsadik et al. |
| 6,274,812 B1 | 8/2001 | Daoud |
| 6,450,458 B1 | 9/2002 | Bernard |
| 6,462,276 B2 | 10/2002 | Shimizu et al. |
| 6,491,535 B1 | 12/2002 | Buse |
| 6,693,238 B2 | 2/2004 | Jadaud et al. |
| 6,836,616 B2 | 12/2004 | Jamison |
| 6,838,616 B2 | 1/2005 | Harrison et al. |
| 6,872,888 B2 | 3/2005 | Santelli, Jr. |
| 7,049,517 B2 | 5/2006 | McCarthy et al. |
| 7,053,303 B2 | 5/2006 | McCarthy et al. |
| 7,115,814 B2 | 10/2006 | McCarthy et al. |
| 7,183,488 B2 | 2/2007 | McCarthy et al. |
| D580,871 S | 11/2008 | McCarthy et al. |
| 2002/0112443 A1* | 8/2002 | Shipman et al. ........... 52/745.13 |
| 2004/0256020 A1 | 12/2004 | McCarthy et al. |
| 2005/0000584 A1 | 1/2005 | McCarthy et al. |
| 2009/0108581 A1 | 4/2009 | McCarthy et al. |

* cited by examiner

CONDUIT CONNECTOR DEVICE AND CONDUIT SYSTEM

RELATED APPLICATION

The present application claims the benefit of co-pending U.S. provisional patent application No. 61/150,164 filed Feb. 5, 2009, which is incorporated herein by reference in its entirety.

BACKGROUND

1. Field of the Invention

The present invention relates generally to conduit, piping or raceway systems, and is particularly concerned with a combined connector and mounting device which connects two segments or lengths of conduit and also attaches the connected conduit segments to a mounting surface.

2. Related Art

One well known method of attaching conduit, electrical metal tubing (EMT) and other forms of piping onto a wall of varying construction is a simple pipe bracket. The bracket is a simple strap that forms a half circle (or full circle) around the conduit. Bolts, screws, lags, or other fastening hardware are inserted into the wall through the strap. In all the known prior art, the attachment hardware is exposed and can be removed without interfering with the piping system.

The attachment for mounting or attaching conduit or other piping systems to a wall or other support surface is normally completely separate from the connectors between adjacent lengths of piping or conduit. With individuals who are schooled in the art, the commonly accepted method for joining pieces of conduit, EMT, and other forms of piping to additional pieces of piping, for the purpose of constructing a piping system throughout, around, under, or over a building or structure, is to use common compression fittings. These fittings are available at multiple hardware, electrical and hardware stores.

SUMMARY

Embodiments described herein provide for a combination conduit connector and mounting device which both attaches adjacent lengths of conduit together and also mounts the connected conduit lengths to a support surface such as a wall, ceiling, floor, or the like.

According to one embodiment, a conduit connector and mounting device comprises a tubular bracket or sleeve having an outer wall, an inner wall for positioning adjacent a support surface, opposite side walls, and open ends, and a cover member or bridge designed for slidable engagement in the bracket. The outer and inner walls of the bracket have aligned first and second openings, and respective stop members or protrusions are provided on the interior face of the inner wall spaced from each end of the second opening. The stop members or protrusions comprise stops for the ends of two conduit segments inserted into opposite ends of the sleeve. The opening in the outer wall allows insertion of a fastener through the outer wall and subsequent engagement through the second opening in the outer wall to secure the inner wall of the sleeve to a suitable mounting surface or support medium. In one embodiment, the cover member is of length less than the sleeve length and has an end wall and downwardly depending side walls of height substantially matching the height of the sleeve. Once the end of a first segment or length of conduit is inserted into a first end of the sleeve to abut one stop member and the inner wall of the sleeve is attached to a mounting surface, the cover member is inserted into the opposite or second end of the sleeve and slid along the sleeve into abutment with the end of the conduit, so that the outer end wall of the cover member extends over and covers the opening in the outer wall of the sleeve, preventing access to the fastener or interior of the conduits after assembly. The end of second length of conduit is then inserted into the second end of the sleeve until it abuts the second stop member and the end of the cover member.

According to another embodiment, a conduit system comprises a plurality of lengths or pieces of conduit and a plurality of conduit connector and mounting devices, with the adjacent ends of one or more pairs of conduit pieces secured together by a respective connector and mounting device which is also attached to a suitable support surface. The conduit system may also include different connector devices adapted for forming bends and T-junctions, and for changing from a conduit of a first size to a conduit of a second size.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a combined connector and mounting device for a conduit system which is used both to engage adjacent ends of two lengths of conduit and also to mount the adjacent conduit lengths on a support surface, as well as a conduit system including a plurality of the combined connector and mounting devices along with other conduit system interfaces and components. The connector and mounting device may be used in any conduit or piping system, including secure conduit systems for secure routing of signaling and transmission lines such as computer, power, communication and similar cables or wires, as well as for other forms of non-secure conduit and piping for conveying other media such as gas lines, water lines, and the like.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1:
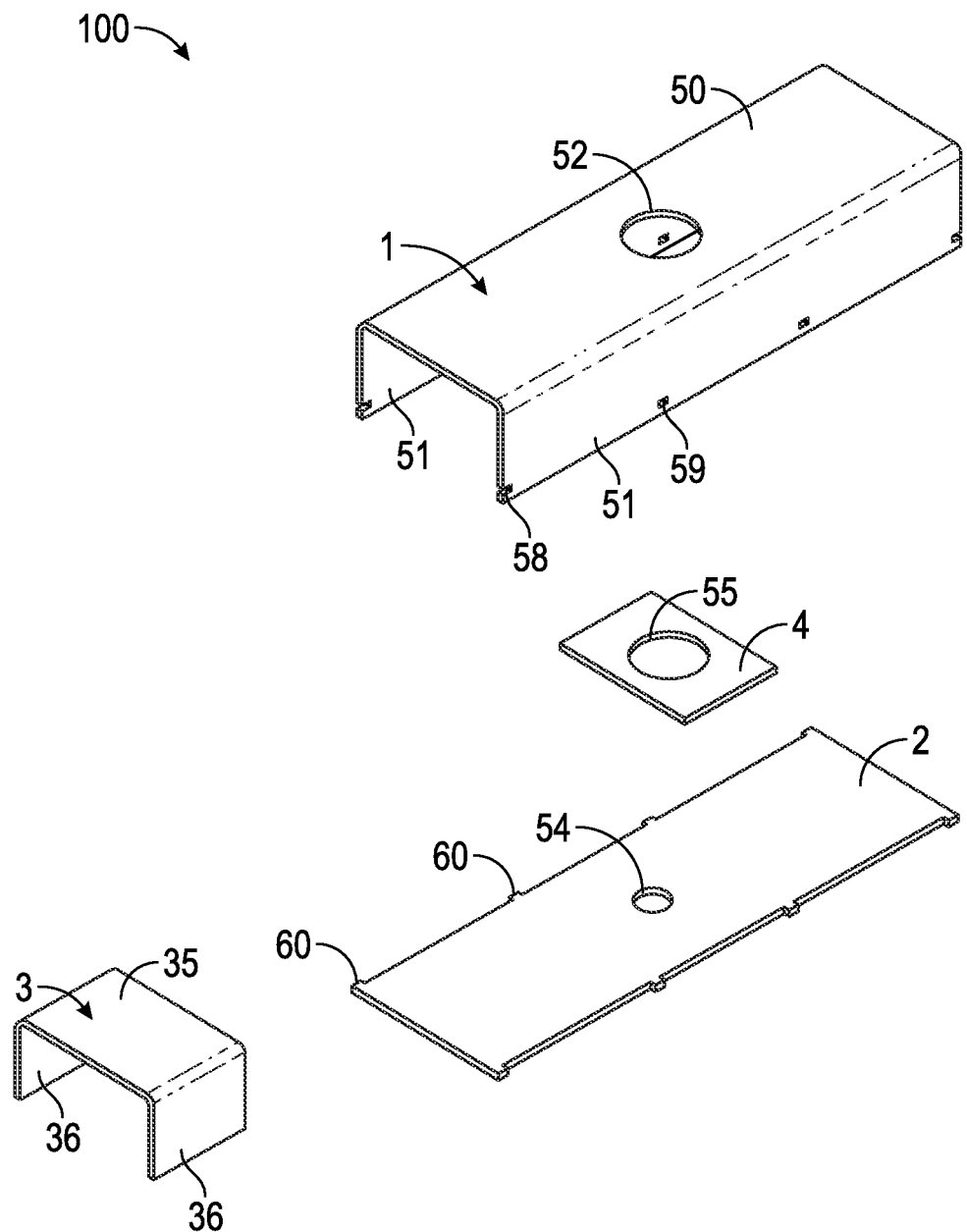
FIG. 1 is an exploded view of a combined conduit mounting and connector device according to a first embodiment.
Figure 2:
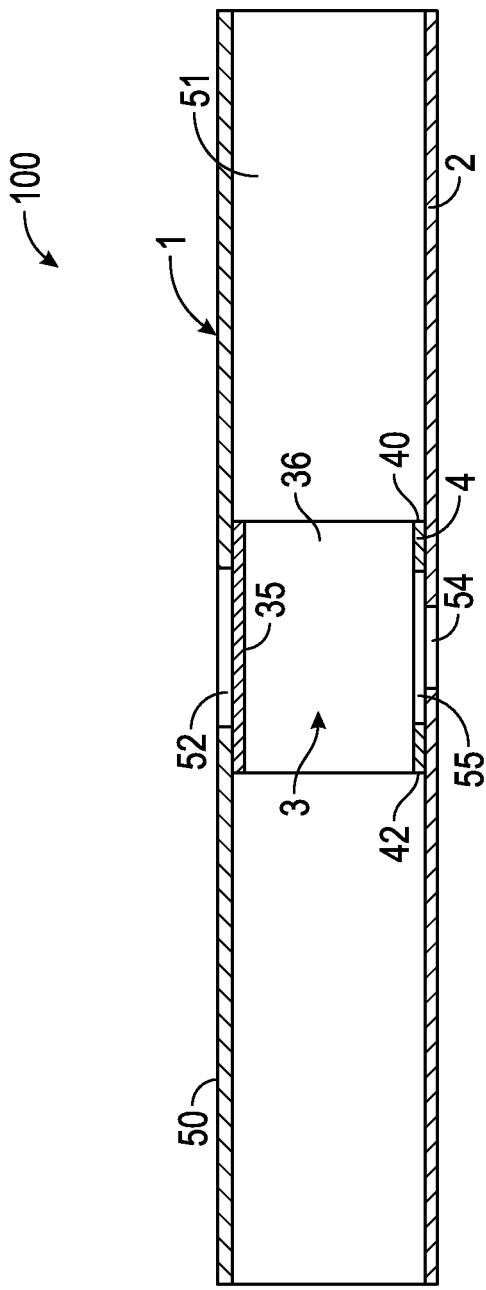
FIG. 2 is a sectional view through the connector device of FIG. 1 in an assembled condition.
Figure 3:
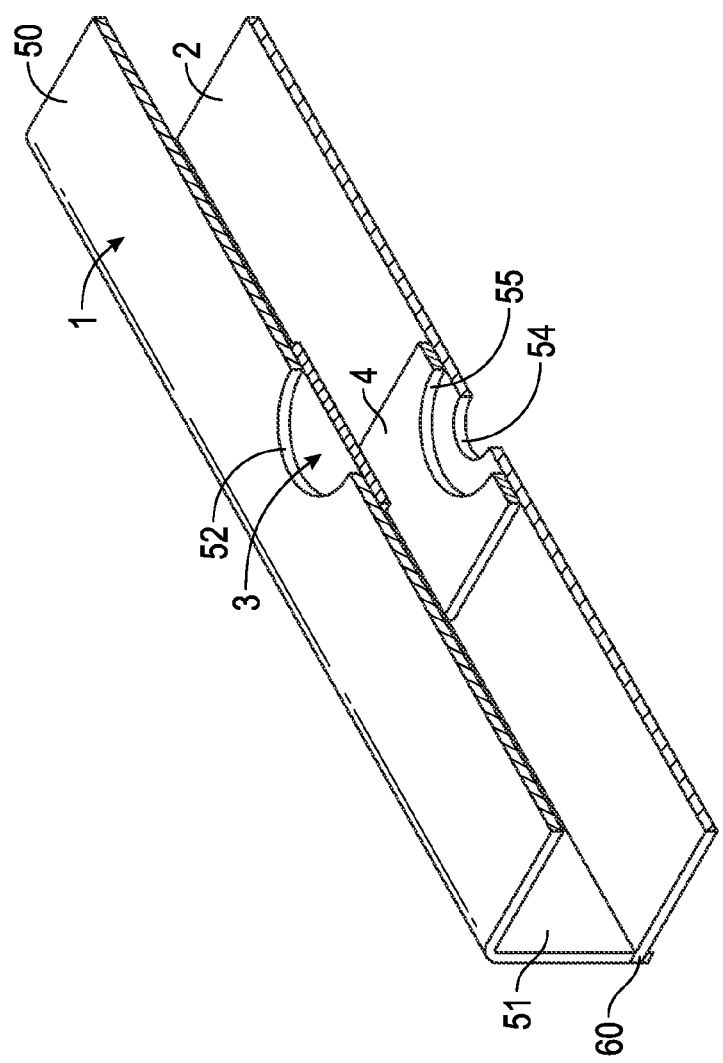
FIG. 3 is a perspective, cut-away view showing one half of the assembled mounting and connector device of FIG. 2.

FIGS. 1 to 3 illustrate a first embodiment of a conduit mounting and connector device 100. The connector device 100 comprises a sleeve having an outer wall 50, inner wall 2, and spaced side walls 51, and a cover or bridge member 3 designed for sliding engagement in the sleeve. In one embodiment, the sleeve may be formed in two parts, comprising an outer part 1 of U-shaped cross section comprising outer wall 50 and spaced side walls 51, and inner wall or plate 2 which is suitably attached to the inner edges of part 1 to form a tubular sleeve. Outer member 1 and inner plate 2 are suitably welded, molded, glued, or otherwise affixed together to form a sleeve or tube. Although the sleeve is of rectangular cross-section in the illustrated embodiment, it may be of any suitable geometrical shape and size depending on the shape and size of the conduit to be connected, such that ends of the conduit can be slidably inserted into opposite ends of the sleeve as explained in more detail below.

A first hole or opening 52 is provided in the outer wall 50 of the sleeve, and a second, aligned smaller hole or opening 54 is provided in the bottom or inner part or plate 2 of the sleeve. The openings are arranged at the center of the sleeve in the illustrated embodiment, although they may be located at different positions in alternative embodiments. In the embodiment of FIGS. 1 to 3, a stop plate or member 4 having an opening 55 is welded on the inside surface of the bottom wall 2 over opening 54, so that the openings 52, 54 and 55 are aligned as seen in FIG. 2. Alternatively, the stop plate or member may be formed integrally with the bottom wall 2. Stop plate 4 has opposite end edges 40, 42 which form end stops as adjacent conduit ends are inserted into opposite ends of the sleeve, as explained in more detail below.

Figure 16:
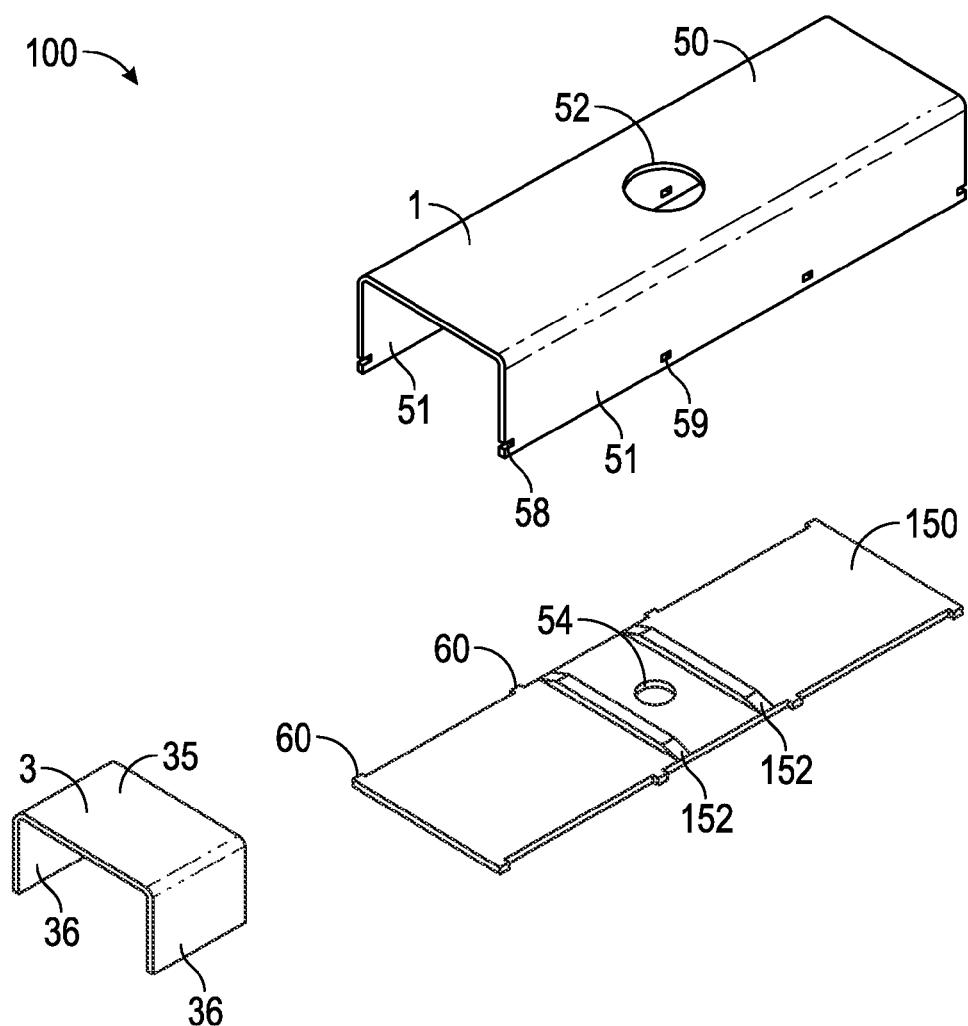
FIG. 16 is an exploded perspective view of a second embodiment of a combined conduit mounting and connector device similar to that of FIGS. 1 to 6 but with a modified inner wall or plate.

In an alternative embodiment, as illustrated in FIG. 16, a modified inner part or wall 150 of the sleeve is provided, in which the welded stop plate or member 4 with end edges forming stops is removed and replaced with dimples or ribs 152 formed integrally in the inner bracket plate 150 at locations spaced on opposite sides of the opening 54. The dimples or ribs 152 in one embodiment are lance bridges formed when the plate 150 is pushed down on a bridge forming tool which pierces or lances the metal at the rib locations to form the bridges or ribs 152. Each rib 152 is a substantially straight rib extending across most of the width of the plate 150 at a location spaced to one side of the opening 54, as seen in FIG. 16. The conduit mounting and connector device of FIG. 16 is otherwise identical to that of FIGS. 1 to 6, and like reference numbers are used for like parts as appropriate. This alternative may be less expensive since it uses less material and does not require welding. Instead of continuous linear ribs 152 as in FIG. 16, the same result may be achieved by end stops formed by a series of spaced dimples across the width of plate 150, or even a single dimple of shorter length than the ribs illustrated in FIG. 16.

Cover member 3 is a generally U-shaped piece of similar cross-sectional shape to the top part of the sleeve 100, and of slightly smaller dimensions so that it can engage slidably in the sleeve. Cover member 3 has an end wall 35 and spaced side walls 36, and is shown in a working position in the sleeve in FIGS. 2 and 3, in which the end wall 35 of the cover member extends over and covers the opening 52 in the outer wall of the sleeve after the mounting hardware has been mounted through the bracket and into the medium to which the device 100 is to be attached. The side walls 51 of part 1 have notches 58 at their opposite ends along with spaced slots 59 aligned with notches 58, while the inner wall or part 2 has spaced, outwardly projecting tabs 60 along its opposite side edges which engage in the respective notches 58 and slots 59 when the parts 1,2 are assembled together as in FIGS. 2 and 3.

The parts of the mounting bracket or connector device 100 can be constructed of various rigid materials, metals, plastics, epoxy resins, etc. and can be made for various geometrical conduits. The size is also variable depending on the size of conduit the bracket is joining and fastening to a mounting surface, such as a wall, ceiling, or floor, or the sides, tops, bottoms of various items.

Figure 4:
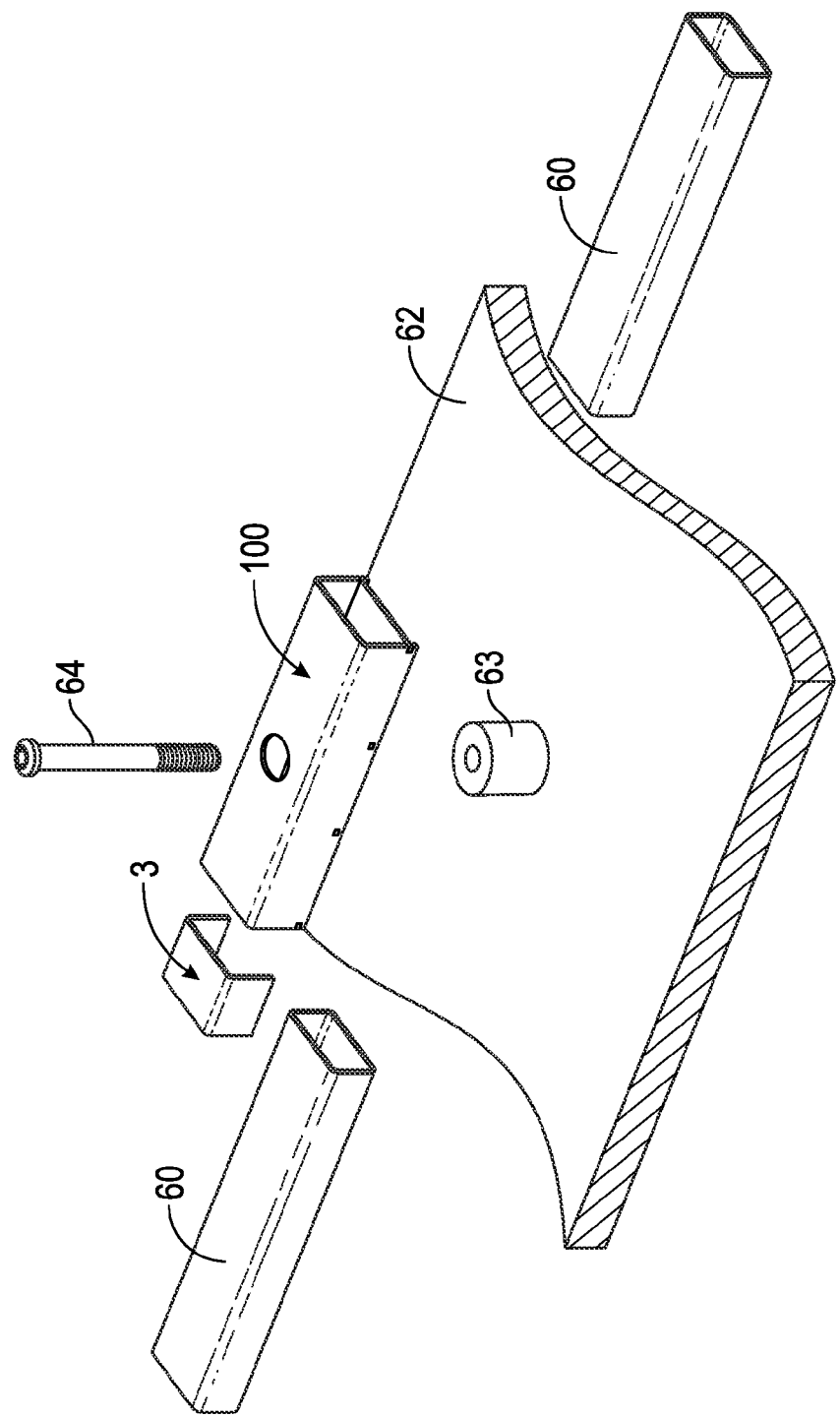
FIG. 4 is an exploded view of the parts of the connector device and the ends of two pipe or conduit segments along with a support to which the connected ends are to be attached using the mounting and connector device.
Figure 5:
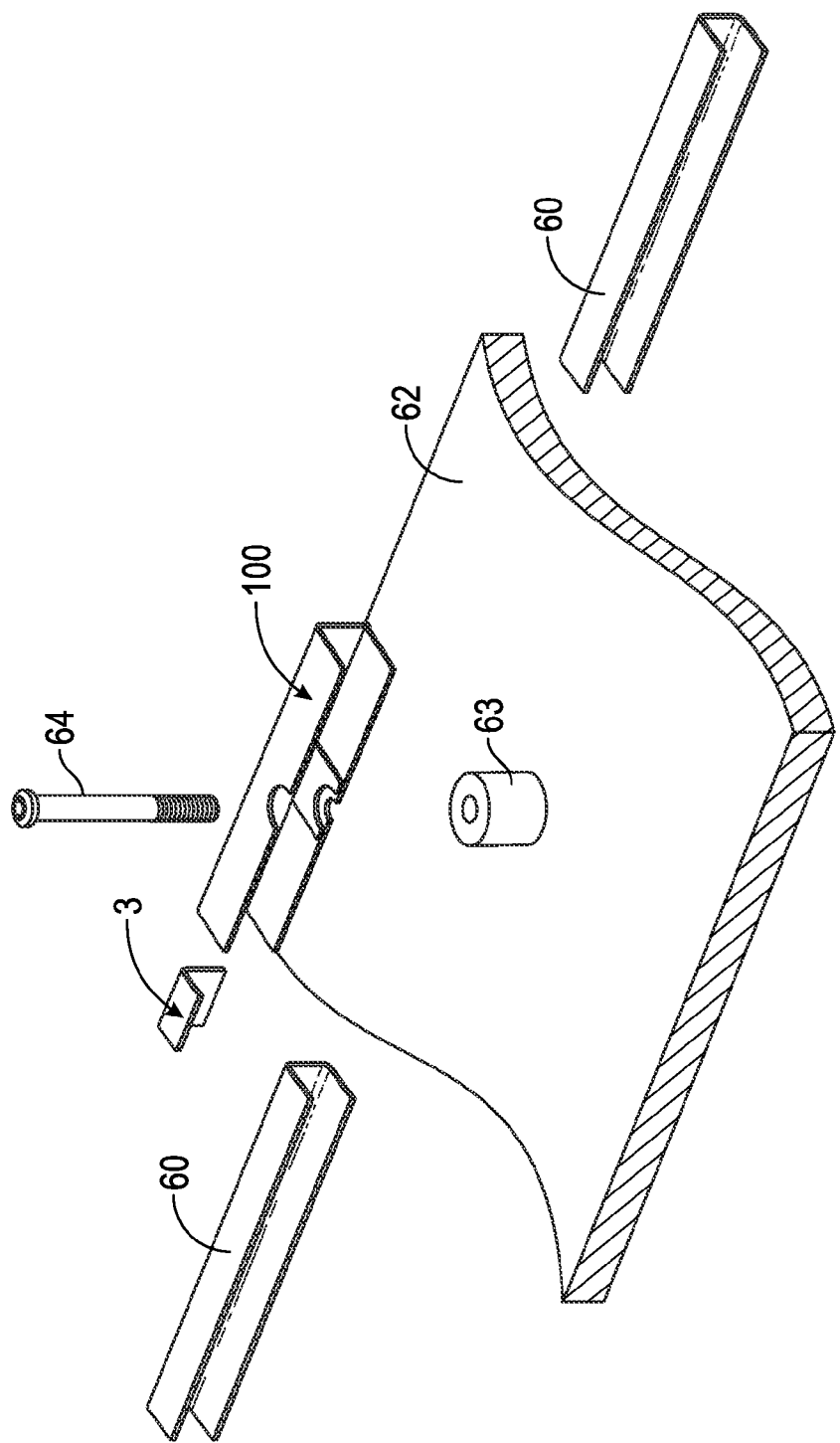
FIG. 5 is a cut-away view of the parts in FIG. 4.
Figure 6:
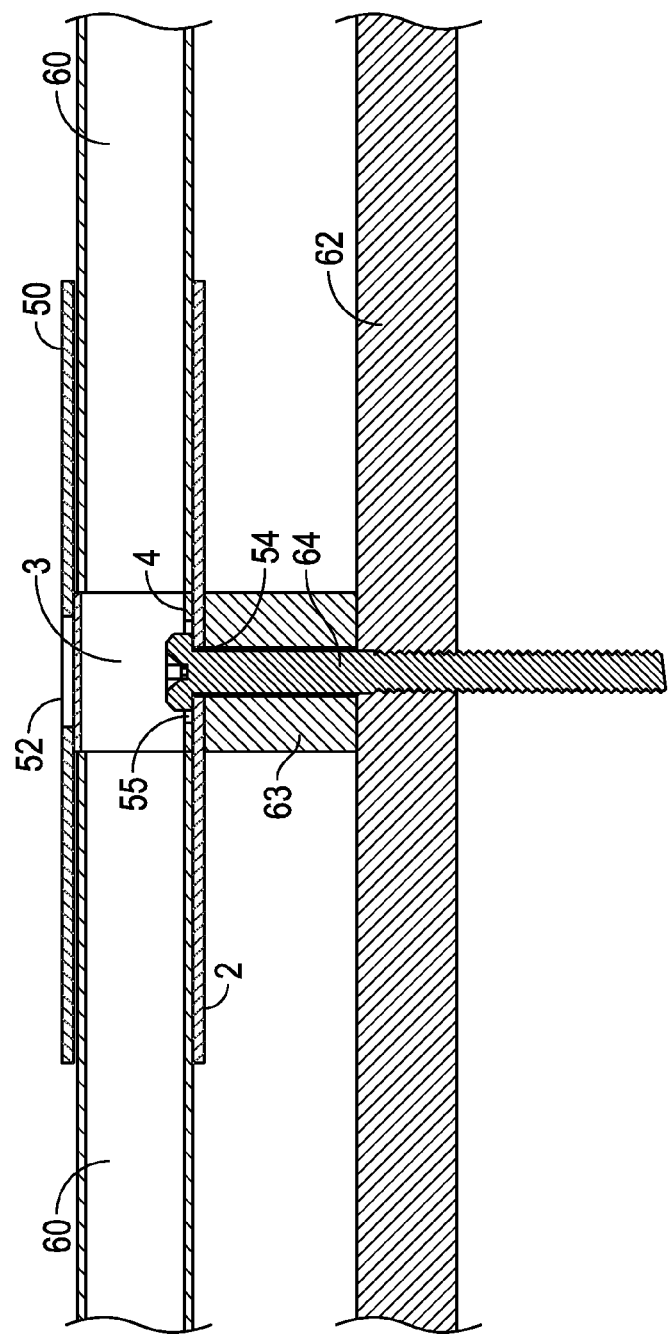
FIG. 6 is a sectional view illustrating the assembled parts of FIG. 4, with the ends of the two lengths of conduit engaged in opposite ends of the connector device and the connector device fastened to the support surface.

FIGS. 4 to 6 illustrate how the mounting and connector device 100 supports end portions of two raceways or conduits 60 and secures the conduits to a suitable support surface or support medium 62, which may be a wall, ceiling, floor, or other support. A spacer 63 may be used to space the conduit system from the support surface in some embodiments. The spacer can be of various shapes and lengths. Suitable fastening hardware, such as bolt 64, is used to secure device 100 to the support surface 62 through spacer 63, as described below.

Figure 16A:
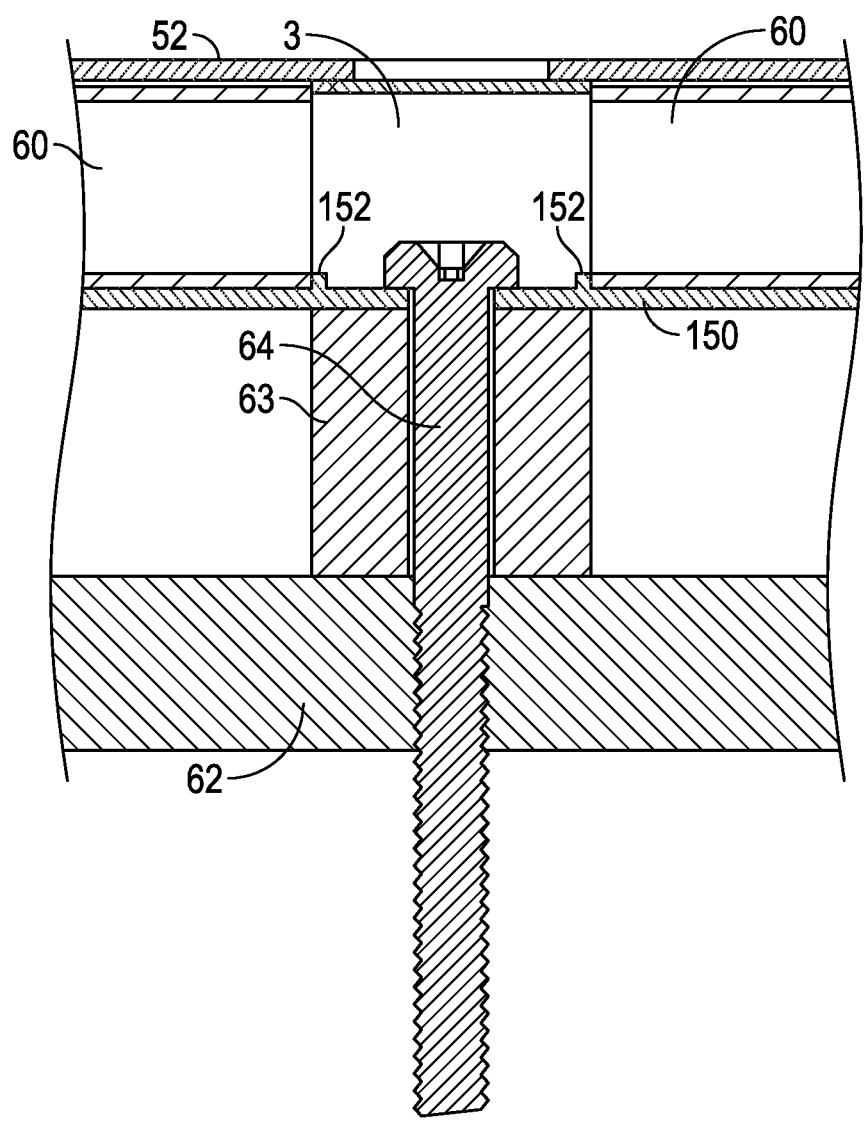
FIG. 16A is a partially cut-away sectional view similar to FIG. 6 but with the top stop plate and inner wall of the conduit mounting and connector device of FIGS. 1 to 6 replaced by the inner wall with dimples or ribs as illustrated in FIG. 16.

FIG. 6 shows the parts in an installed view, while FIG. 16A is a sectional view of the central position of FIG. 6 but with the inner wall 2 and stop plate 4 replaced by the modified inner wall 150 with dimples or ribs 152 as illustrated in FIG. 16. Additional mounting and connector devices 100 secure successive lengths of conduit together at regular intervals, e.g., a connector device 100 installed at one end of 5 feet of conduit which is installed into another connector device at its opposite end, with the next length of conduit installed into that connector device, and so on. Each connector device 100 is secured to the support surface 62 by first aligning the holes 52,55,54 with the through bore in spacer 63 (if used) and then inserting the bolt 64 through the larger hole 62 in the outer wall of device 100, through the spacer, and screwing it into the support surface 62 as illustrated in FIG. 6. The end portion of a first conduit 60 is then inserted into one end of the sleeve 100 until it contacts the end stop which is located on the same side of opening 54 to the conduit. In the illustrated embodiment, the end stop comprises the first end 40 of plate 4. In the alternative embodiment, the end stop comprises a rib or dimple 152 formed in the bottom bracket plate 150 of FIG. 16, and FIG. 16A illustrates the end portion of each conduit 60 contacting a respective rib or dimple 152.

The cover member or bridge 3 is then inserted into the opposite end of sleeve 100 with the end wall 35 adjacent the outer wall 50 of the sleeve, until it abuts the end of the inserted conduit end portion 60. At this point, the end wall 35 of the cover member covers the enlarged access hole 52 in the outer wall 35. The end portion of a second conduit 60 is then inserted into the opposite end of the sleeve until it abuts the second end 42 of plate 4 (or the second dimple or rib 152 in plate 150, in the embodiment of FIG. 16, as illustrated in FIG. 16A), as well as the exposed end of cover member 3, as illustrated in FIG. 6. The opposite ends of the two conduits or conduit pieces 60 are suitably connected to additional lengths of conduit in the same way, or to other system interfaces, secure enclosures, bend-forming connectors, T-junctions, end caps, or the like. Once installation is complete, cover member 3 restricts unauthorized individuals from accessing and unscrewing the bolt 64 and removing the two sections of conduit 60 from the mounting bracket and connecting device 100. Each section of conduit is secured between two devices 100 or between other junction devices, as described below in connection with FIGS. 7 to 13.

Figure 7:
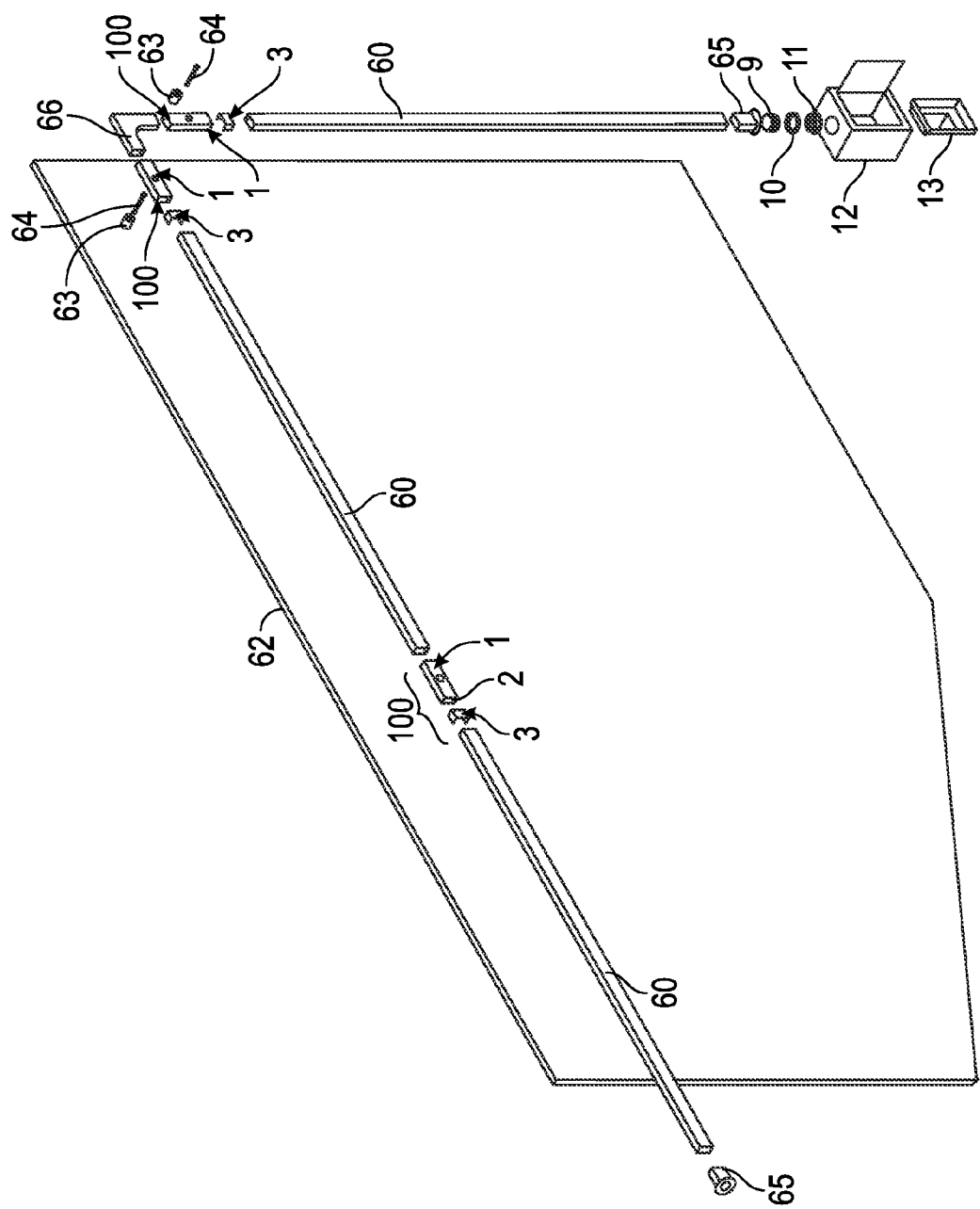
FIG. 7 is an exploded perspective view illustrating one example of a conduit system using the mounting and connector device of FIGS. 1 to 3 along with other interfaces and system components.
Figure 8:
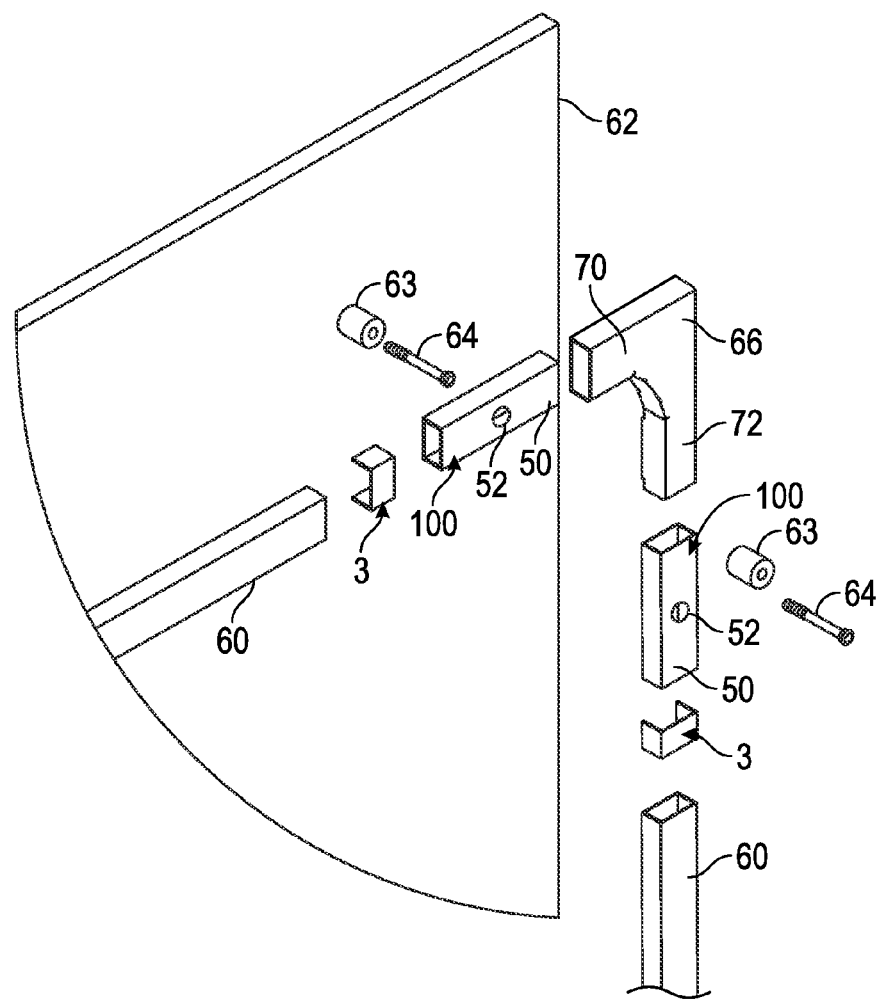
FIG. 8 is an exploded view of part of the system of FIG. 7 on an enlarged scale.

FIGS. 7 and 8 illustrate one embodiment of a conduit or raceway system comprising multiple conduit segments and joint or connecting members securing the segments together or to other parts of the system, as well as end joint members or end caps at the end of a run of conduit. In this embodiment, one or more of the joint members comprise connector devices 100 to secure or support end portions of successive conduit or raceway pieces or segments 60 end to end, along with other interface or joint members, as described below. Some parts in FIGS. 7 and 8 are identical to those described above in connection with FIGS. 1 to 6, and like reference numbers are used for like parts as appropriate. In one embodiment, the conduit or raceway pieces 60 are of small or mini-duct size and comprise lengths of a solid rectangular tube of around 1.5 inches by 0.75 inches in size, but conduit of different sizes may be used in alternative embodiments, along with mounting brackets 100 appropriately shaped and sized for telescopically receiving the conduit end portions in the manner illustrated in FIGS. 4 to 6. The connector device of FIG. 16 may be used in place of connector device 100 in the system of FIGS. 7 and 8. FIGS. 7 and 8 are exploded views (only to the top level assembly) of one type of installation scenario with the small size raceway or conduit 60, showing the parts separated, with FIG. 8 showing an enlarged exploded view of a corner portion of the system.

In the scenario of FIGS. 7 and 8, cables or the like are guided through the conduit or raceway system from joint member or sleeve 65 at the left hand side in FIG. 7 to a joint member or connector 65 connected to secure enclosure or drop box 12 through which an authorized user can connect to a computer system or network, for example as described in U.S. Pat. No. 6,838,616 of Harrison et al. and co-pending U.S. patent application Ser. No. 11/709,892 of McCarthy filed on Feb. 23, 2007, the contents of each of which are incorporated herein by reference. Enclosure 12 may be a user drop box or user interface enclosure, for example a user drop box or secure enclosure as sold by Holocom Inc. of San Diego, Calif. A faceplate connector insert 13 is mounted in the box and provides a mounting surface for network connection faceplates/covers, for example as described in U.S. Pat. No. 7,608,780 and Design patent application No. 29/305,071 filed on Mar. 13, 2008, and U.S. Design Pat. No. D580,871, the contents of each of which are incorporated herein by reference. As illustrated in the lower right hand corner of FIG. 7, interface or sleeve 65 is connected to the user drop box 12 through a threaded nipple 9 which threads into interface 65 and extends through hole 94 in an end wall of box 12. Hole 94 may be pre-made during manufacture of the box or may be made in the field on installation of the system. A threaded lock ring 10 is threaded onto nipple 9 inside the box, and a conduit bushing 11 inside ring 10 guides cable into the box and is used to soften any metallic or sharp edges of nipple 9.

An interface member or sleeve 65 is located at each end of the conduit system in FIG. 7. Interface member 65 at the upper left hand corner may to connect to another enclosure like enclosure 12 or to another section of the conduit system via a threaded nipple. Interface member 65 may be an internally threaded square sleeve for engaging over an end of a piece of conduit 60, with a flange at one end, and may be any suitable interface device, such as any of the enclosure interface sleeves (INF) sold by Holocom Inc. of San Diego, Calif., including the interface sleeve as described in U.S. patent application Ser. No. 12/256,709 of McCarthy filed on Oct. 23, 2008, the contents of which are incorporated herein by reference.

In FIG. 7, two lengths of conduit 60 are secured generally horizontally end-to-end along an upper region of a surface 62 which may be a wall, although they may be located elsewhere in alternative embodiments. Conduit lengths 60 extend between a first interface member 65 and a 90 degree connector 66. A third length of conduit 60 extends vertically between the 90 degree connector 66 and the enclosure 12. A first mounting and connector device 100 forms a connection between the two horizontal lengths of conduit 60, while a second connector device 100 is located between the conduit 60 and a horizontal leg 70 of the 90 degree connector 66. A third connector device 100 is located between the vertical leg 72 of connector 66 and the vertical length of conduit 60. Each connector device 100 is secured to the mounting surface or wall 62 as illustrated in FIGS. 4 to 6, using a fastener screw or bolt 64 which extends through the opening in the lower wall of the connector sleeve and through a spacer 63 into the underlying wall surface 62.

Figure 9:
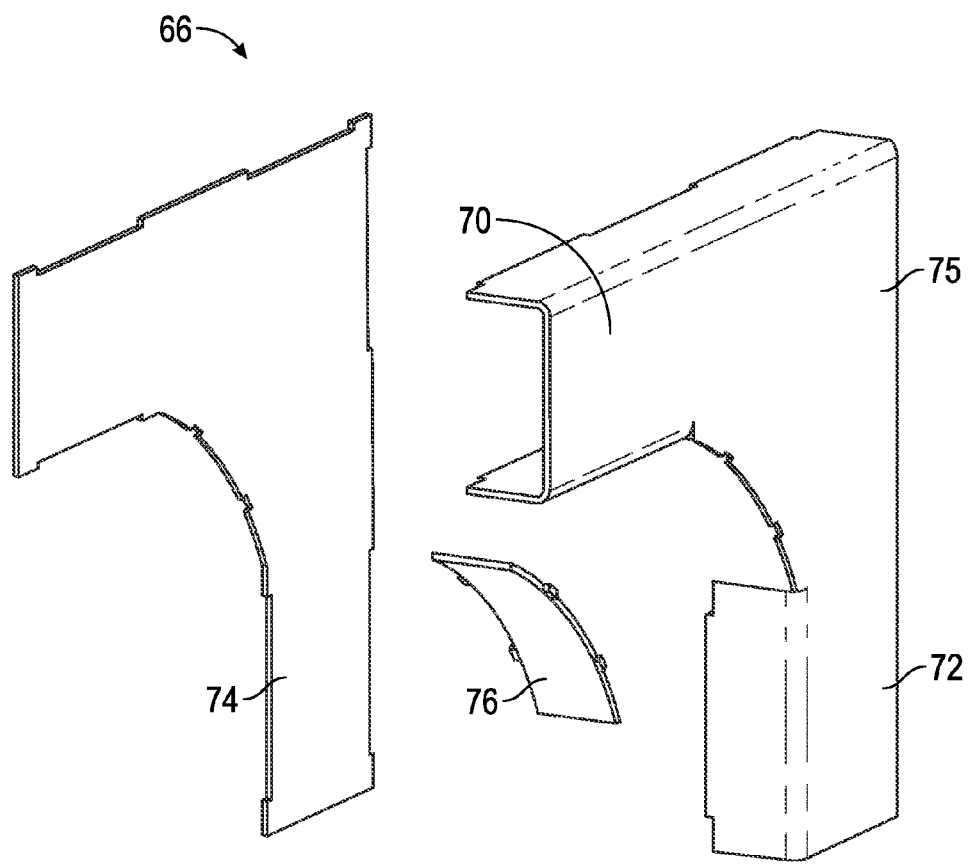
FIG. 9 is an exploded view of the 90 degree bend connector of FIGS. 7 and 8.

FIG. 8 is an exploded (top level assembly only) perspective detail view of 90 degree connector 66 with connector devices 100 at each end, along with the associated hardware, while FIG. 9 illustrates the separated parts of the connector 66. FIG. 8 is derived from FIG. 7 and has the same corresponding item numbers. As seen in FIGS. 8 and 9, the 90 degree connector comprises a hollow tubular section with a right angle bend between horizontal or first leg 70 and vertical or second leg 72. The 90 degree connector 66 has a flat base 74, a 90 degree cover 75, and a cover curve 76. Cover curve 76 has a 3 inch bend radius per telecommunication cabling standards. All three pieces are welded together during manufacturing and provide a solid housing in which each leg fits telescopically into respective connector devices 100, as seen in FIG. 8. Other similar connectors may be provided to provide bends at different angles and T-junctions as needed based on system requirements and available space for the conduit or raceway system.

When the parts are assembled together, the right end portion of a horizontal length of conduit 60 is inserted into one end of the horizontal connector device 100 seen in FIG. 8, while the end of the horizontal leg 70 of 90 degree connector 66 is inserted into the opposite end of mounting bracket or sleeve 100, with the cover member or bridge piece 3 of bracket 100 located between the ends of the conduit 60 and leg 70. The vertical leg 72 of the 90 degree connector 66 is inserted into one end of the vertical connector device 100 while the upper end of the vertical length of conduit 60 is inserted into the opposite end of device 100, again with cover member or bridge piece 3 located between the ends of vertical leg 72 and vertical conduit length 60.

The system of FIG. 7, once assembled with successive lengths of the conduit 60 engaging in the ends of mounting and connector devices 100 as indicated in FIG. 6, and in suitable end interfaces at opposite ends of a run of conduit lengths, cannot be disassembled for access to the cable inside the conduit at an intermediate point in the run. Thus, the interior of the conduit can only be accessed at a secure enclosure 12 or other secure housing without actually cutting the conduit 60. This system therefore provides security for the contents and signal lines guided inside conduit 60.

Figure 10:
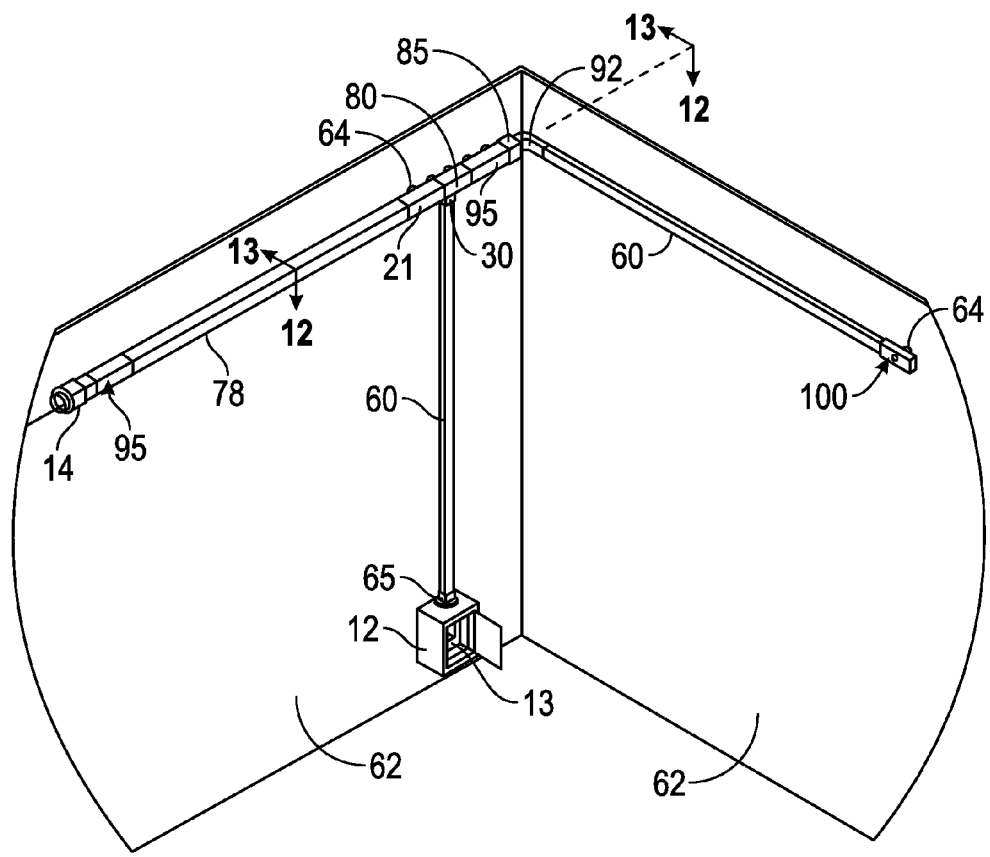
FIG. 10 is a perspective view of part of another conduit system including conduit segments of different sizes which utilizes one or more of the connector devices of FIGS. 1 to 3.
Figure 11:
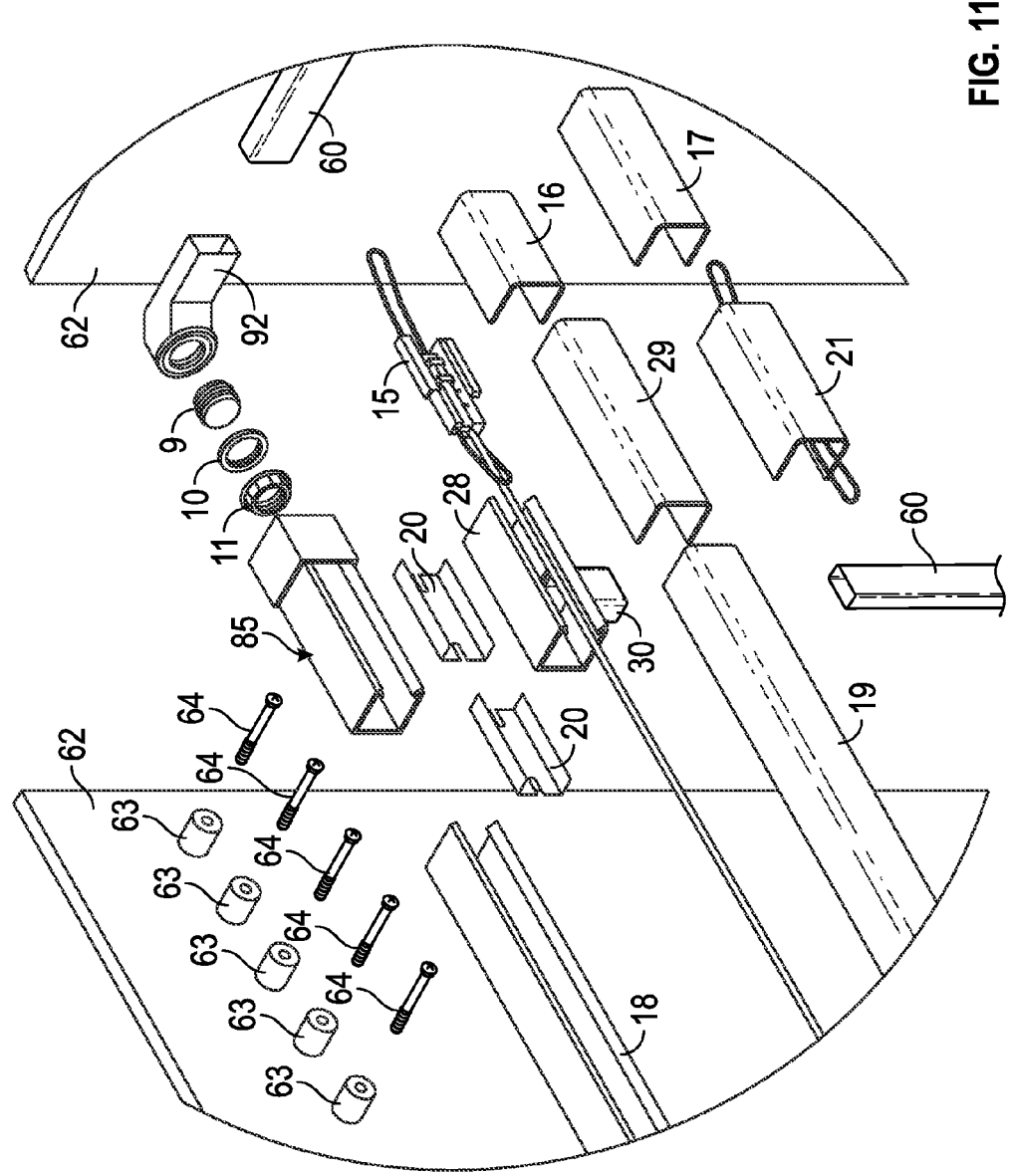
FIG. 11 is an exploded perspective view of part of the system of FIG. 10 including a corner connection.
Figure 12:
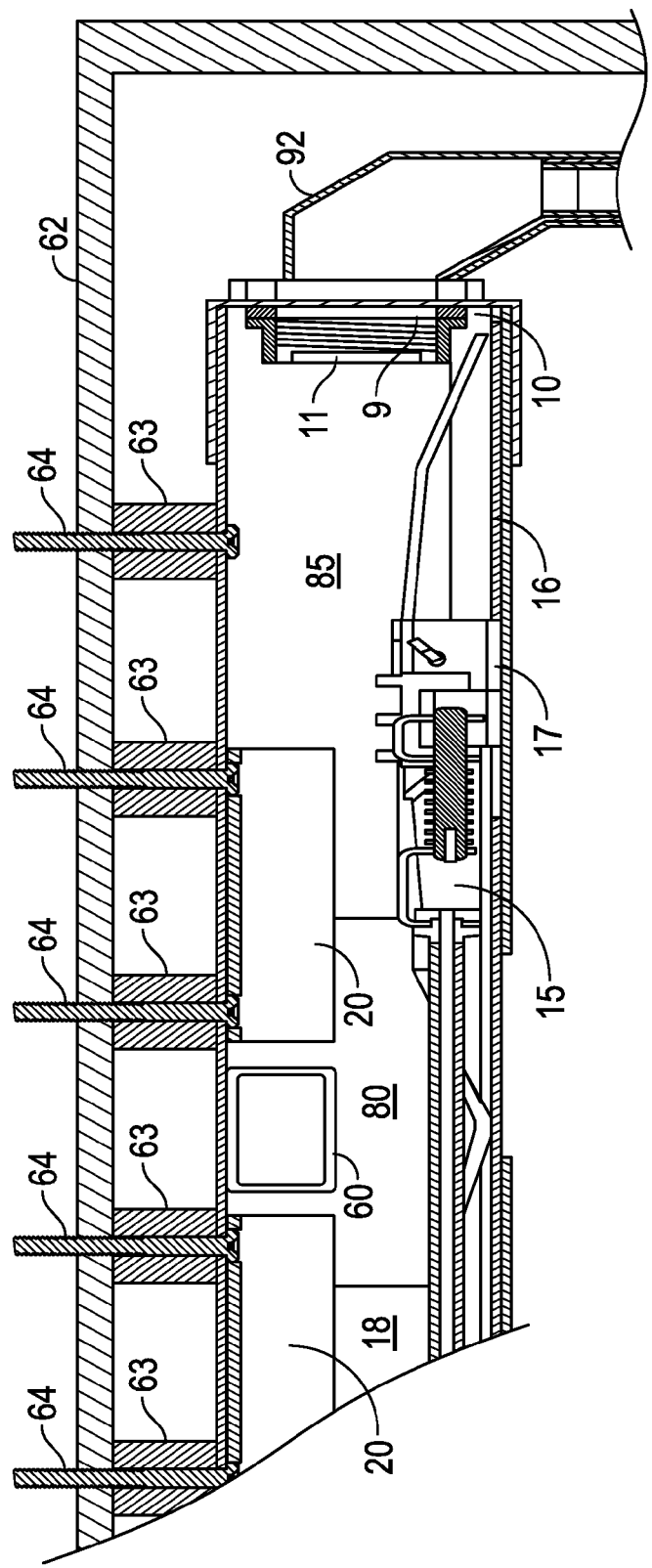
FIG. 12 is a horizontal sectional view through the corner connection of the system of FIG. 10 on the lines 12-12 of FIG. 10.
Figure 13:
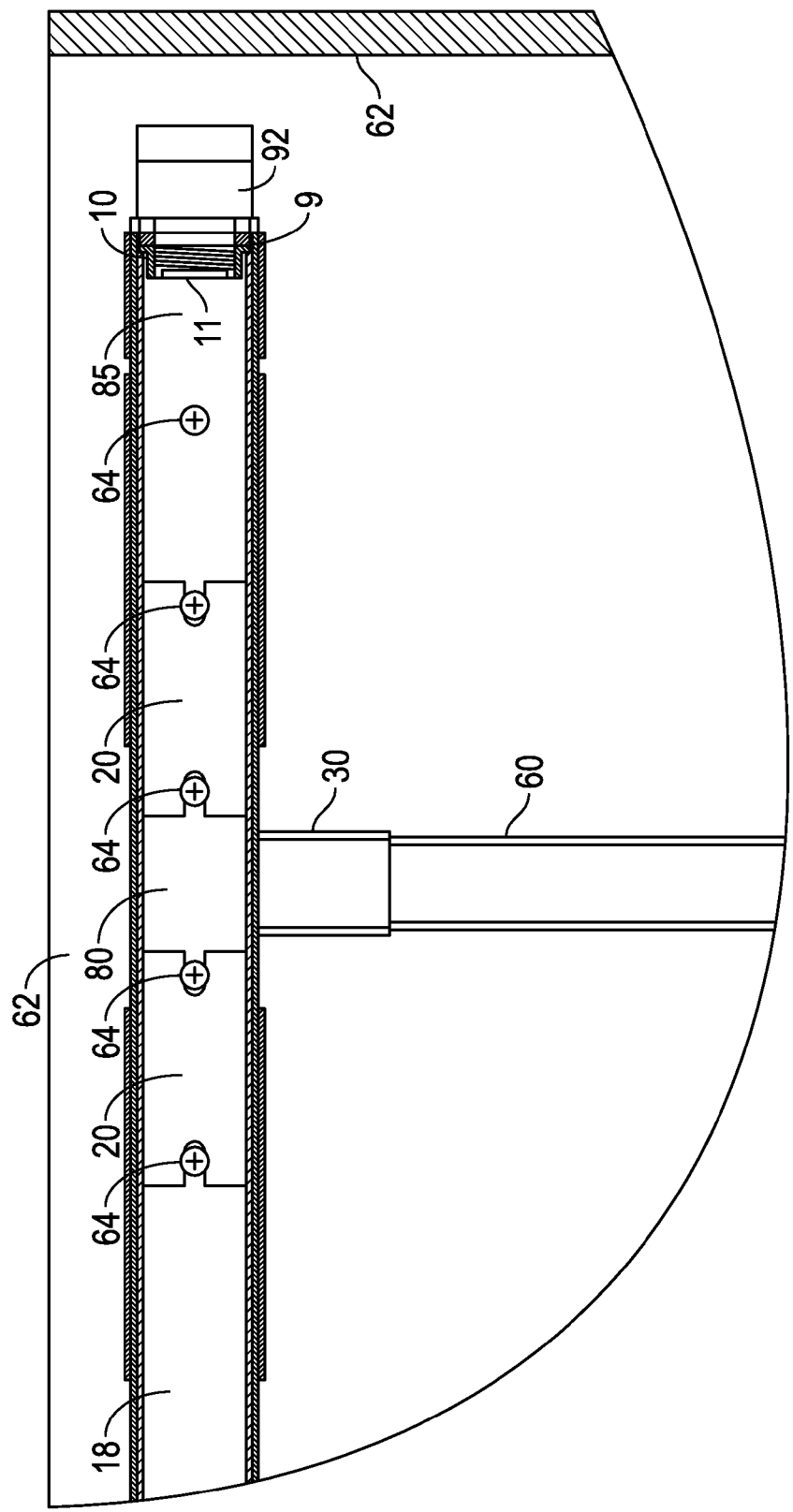
FIG. 13 is a vertical sectional view through the T-junction of FIG. 10 on the lines 13-13 of FIG. 10.
Figure 14:
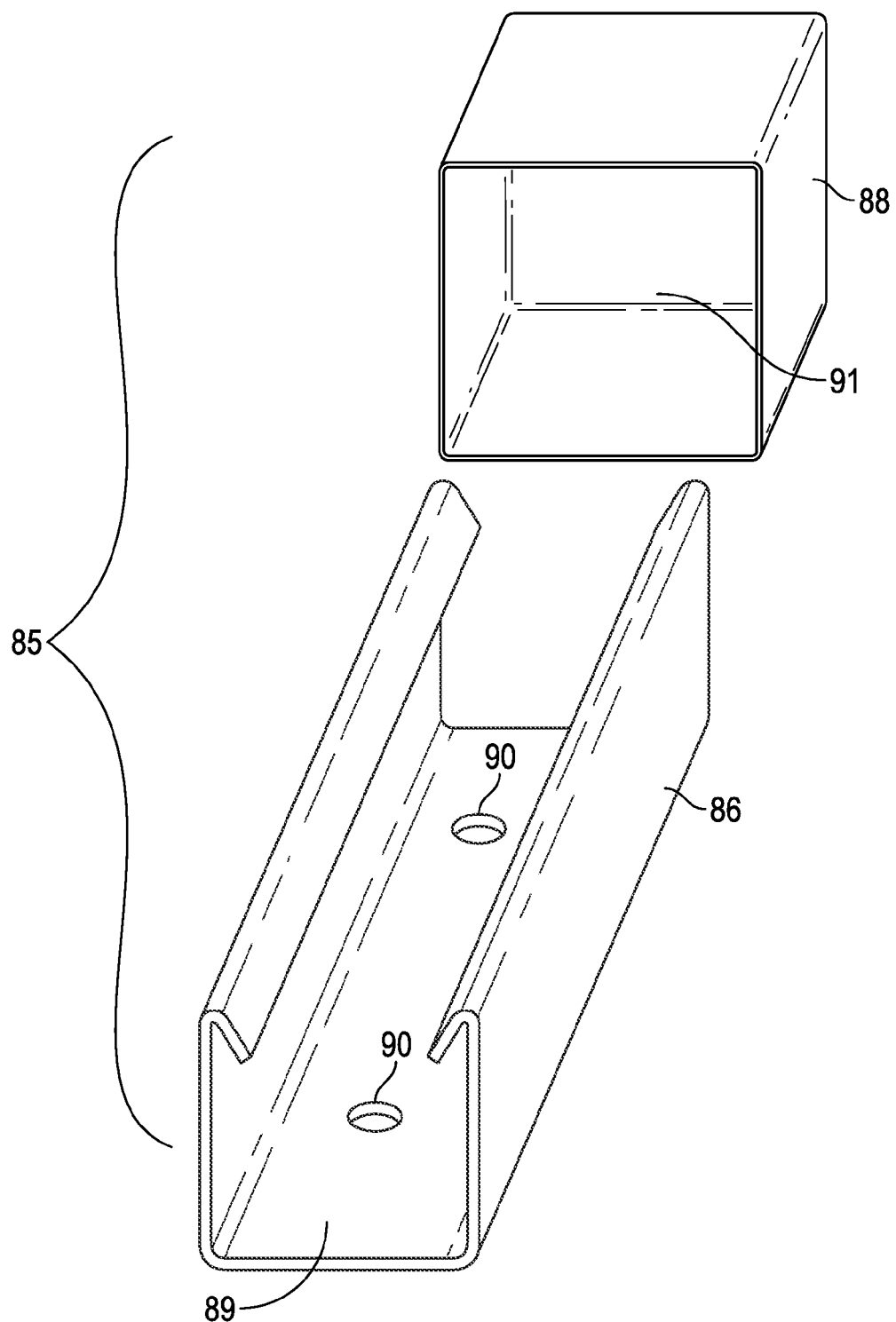
FIG. 14 is an exploded perspective view of an end connector of the system of FIG. 11.
Figure 15:
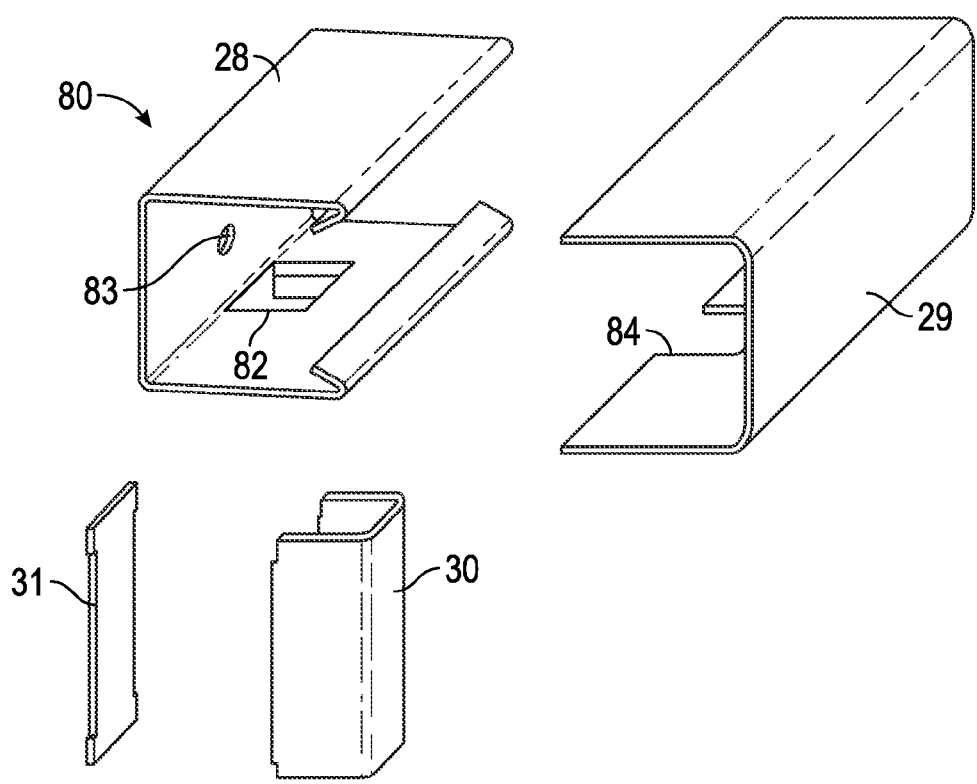
FIG. 15 is an exploded perspective view of a reducing 3-way connector device of the system of FIG. 11.

FIGS. 10 to 13 illustrates another exemplary conduit installation scenario in which the smaller duct or raceway 60 of the previous example interfaces with a raceway 78 or conduit system of larger dimensions, for example the 2×2 secure raceway manufactured by Holocom Inc. of San Diego, Calif., which is sold under the part name SDS-WM-RCW. Other raceways or larger dimension conduits may be used in alternative embodiments. FIGS. 14 and 15 illustrate some individual components of the system in more detail. The larger dimension part of the conduit system may be a secure conduit system as described in the following US patents, the contents of which are incorporated herein by reference: U.S. Pat. Nos. 7,049,517; 7,053,303; 7,115,814, and 7,183,488, or may be any other conduit of different dimensions. Some parts of the system of FIGS. 10 to 13 are identical to parts in the previous example, and like reference numerals are used for like parts as appropriate. As best illustrated in FIG. 11, the raceway 78 comprises a base or channel 18 covered by a topcap 19, and these parts are held together by various interface components as described in the aforementioned patents, which are also illustrated in the exploded view of FIG. 11.

Starting from the left-hand corner of the system in FIG. 10 is an interface sleeve and flange 14. This interfaces between the raceway 78 and an enclosure, or another section of raceway 78 via a threaded nipple/pipe. Next to the interface sleeve 14 is a raceway lock assembly 95 which secures the interconnected conduits together and restricts unauthorized access to the network lines guided through the system, as described in the aforementioned patents directed to a secure conduit system. Another raceway lock assembly 95 is located at the opposite end of raceway 78, next to three way connector 80. As seen in the exploded view of FIG. 11, lock assembly 95 comprises a lock body 15, a topcap starter piece 16, and a raceway lock connector 17 which is assembled with lock body assembly 15 and topcap starter piece 16 to provide a more secure internally accessed system to keep the raceway sealed. Item 18 is the channel part of the raceway. Item 19 is the topcap or cover of the channel which engages over channel 18 to form the conduit or raceway 78. A secure raceway joint 20 adds rigidity to all raceway end-to-end joints. Topcap end-to-end connector 21 securely joins two sections of a topcap 19 and/or similar topcap profile part.

In this embodiment, a generally T-shaped, secure reducing three way connector 80 provides a transition between two different size conduits. FIG. 15 is an exploded view of the parts of the reducing three way connector. An example of an application for 3 way connector 80 is a vertical transition to a small conduit or tube 60 from horizontal runs of a larger conduit, such as a raceway 78 as described above. As illustrated in FIG. 15, the three way connector comprises a channel-shaped base 28 of the same profile as the channel 18, a cover 29 having the same profile as the topcap 19, and an interface sleeve 30,31 of suitable dimensions for receiving an end of the smaller conduit 60, which is secured to an opening 82 in channel 28 to form the T-junction. As indicated, the interface sleeve may be made in two parts, specifically a cover 30 of U-shaped cross-section and a base plate 31 welded to the lower end of the cover. Base 28 has a rectangular opening 82 in one side wall, while the cover 29 has a corresponding recess 84 in one side wall which is aligned with opening 82 when the parts are secured together. The base has one or more openings 83 for securing to a suitable support surface using suitable fastener hardware, such as bolt 64 as indicated in FIG. 12, before cover 29 is engaged over the base. The end of the interface sleeve is suitably welded to base 28 in alignment with opening 82, as illustrated in FIGS. 10 and 13. When the parts are assembled as in FIG. 10, the upper end of conduit or tube 60 engages in the end of the interface sleeve 30,31 while adjacent raceway sections 78 or other interfaces may be secured through the upper, enlarged portion of the three way connector 80 via joints 20 at each end of the upper, enlarged portion 28, 29. Alternatively, an end run connector 85 may be secured at one end of enlarged portion 28, 29, as illustrated in FIGS. 10 to 13.

An end run connector 85 provides an end junction for the secure raceway portion of the system, and can be used with or without the three way connector 80. FIG. 14 is an exploded view of the end connector 85, which comprises a base 86 of similar shape to the raceway base or channel 18, and an end cap 88 which may be closed on five sides, with an open end which receives the end of base 86. Base 86 has a base wall 89 having a plurality of openings 90 which receive fasteners such as bolts 64 to secure the end run connector to a wall, as illustrated in FIGS. 12 and 13. The closed end 91 of end cap 88 may be provided with an opening so that it can be used as an interface with a section of the smaller size conduit 60 via an interface sleeve 65 as in FIG. 7. End cap 88 with a suitable end wall opening may alternatively connect to a modified interface sleeve 92 as illustrated in FIG. 11, or to other system interfaces. Sleeve 92 incorporates a 90 degree bend and provides a step down from the larger size raceway 78 to conduit 60. As with interface sleeve 65, modified interface sleeve 92 is attached to an enclosure or to end cap 88 through use of items 9, 10, and 11 of FIG. 7. A suitable hole for this purpose may be provided in end cap 88 via standard installation tools/techniques. End run connector 85 can also serve as a through wall transition point through the wall side of the assembly via threaded pipe to either an enclosure, another section of raceway 78, another interface sleeve, and/or another modified interface sleeve 92. As seen in FIGS. 10 to 13, three way connector 80 is used in conjunction with fasteners 63 and 64; raceway 78, raceway joint 20 and end-to-end connector 21; and lock body assembly 15, topcap starter piece 16, and raceway lock connector 17. End connector 85 is used in conjunction with fasteners 63 and 64; raceway 78, raceway joint 20, and/or lock body assembly 15, topcap starter piece 16, and raceway lock connector 17 to provide a secure seal.

The mounting and connector device described above provides a connection or interface between adjacent lengths of tubing or conduit, or between a length of conduit and another component, and also provides a mounting arrangement for securing the connected conduit lengths or other interconnected system parts to a support medium. At the same time, access to the fastening hardware is restricted by the internal bridge or cover member. In some embodiments of a system including the connector devices, additional interfaces such as T-joints, 90° interfaces and reducing T-joints and interface components are provided for added versatility in secure and non-secure conduit system design and installation.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A conduit connector and mounting device for connecting two conduit segments of a secure conduit system, comprising:
   an elongate, tubular connecting bracket having a longitudinal axis, an inner wall, an outer wall secured to the inner wall, a first open end, and a second open end aligned with and facing the first open end, the bracket being configured for mounting on a support surface with the inner wall facing the support surface;
   the outer wall of the bracket having a first opening spaced from the open ends of the bracket and the inner wall having a second opening aligned with the first opening;
   a fastener member configured to extend through the second opening in the inner wall and to mount the bracket on a support surface;
   the first open end of the tubular bracket being configured to receive an end portion of a first conduit segment and the second open end of the tubular bracket being configured to receive an end portion of a second conduit segment aligned with the first conduit segment;
   the inner wall having first and second raised stop formations facing the outer wall, each stop formation extending in a direction generally transverse to the longitudinal axis of the bracket, the first stop formation being spaced a predetermined distance from the second opening between the second opening and the first open end and the second stop formation being spaced a predetermined distance from the second opening between the second opening and the second open end; and
   a cover member slidably engaged inside the bracket and extending under the outer wall and across the first opening to block access to the interior of the bracket and the fastener member through the first opening when the cover member is located in a predetermined position inside the bracket over the stop formations;
   wherein the first and second stop formations comprise stops configured for engagement with opposing ends of respective first and second conduit segments inserted into the respective first and second open ends of the bracket and the cover member is held in said predetermined position between opposing ends of the conduit segments and covering the first opening to block unauthorized access to the interior of the bracket through the first opening when the conduit segments and bracket are assembled in a secure conduit system, wherein the cover member is generally U-shaped and has a first wall having opposite sides and first and second side walls extending from the respective opposite sides of the first wall, the first wall covering the first opening inside the tubular bracket with the first and second side walls extending towards the inner wall when the cover member is in said predetermined position over the stop formations.

2. The device of claim 1, wherein the first opening is of larger cross-sectional dimensions than the fastener.

3. The device of claim 1, wherein the first opening is of larger diameter than the second opening.

4. The device of claim 1, wherein the stop formations comprise raised parallel ribs formed on the inner wall of the bracket.

5. The device of claim 1, further comprising a stop plate having a third opening secured to the inner wall with the third opening aligned with the first and second openings, the stop plate having opposite edges extending transverse to the side walls which comprise said stop formations.

6. The device of claim 5, wherein the third opening is of larger diameter than the second opening.

7. The device of claim 1, wherein the stop formations are formed integrally on the inner wall of the bracket.

* * * * *